Oct. 2, 1956 M. P. MARTINSON 2,764,928
AUTOMOBILE VENTILATOR
Filed Dec. 28, 1954
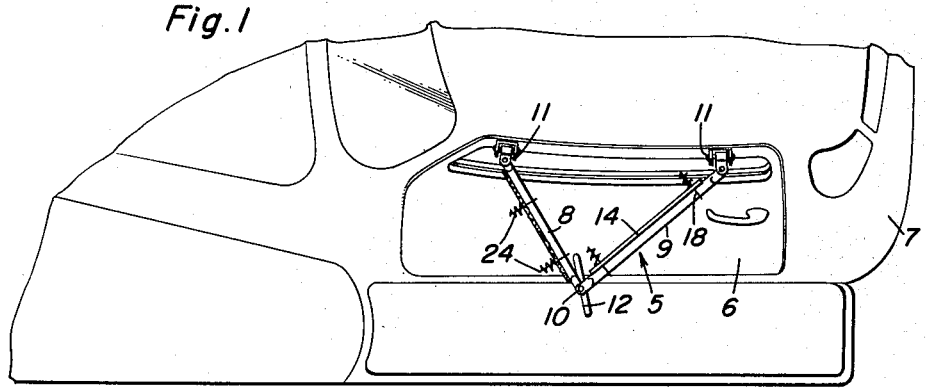
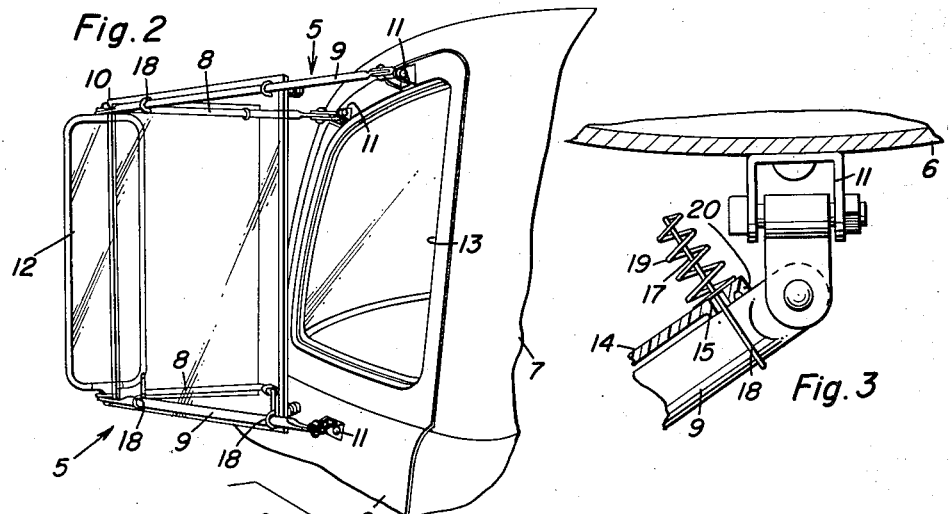
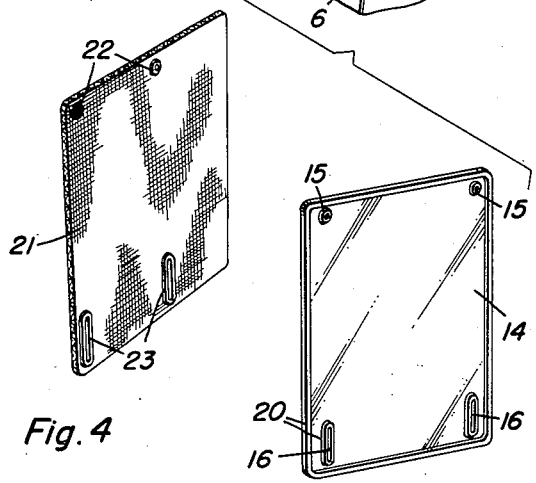
Marvin P. Martinson
INVENTOR.

United States Patent Office 2,764,928
Patented Oct. 2, 1956

2,764,928

AUTOMOBILE VENTILATOR

Marvin P. Martinson, Casper, Wyo.

Application December 28, 1954, Serial No. 478,152

2 Claims. (Cl. 98—2)

The present invention relates to new and useful improvements in ventilators for automobiles, particularly motor trucks, and has for one of its important objects to provide, in a manner as hereinafter set forth, a device of this character which is adapted to be expeditiously installed for operation on the usual supporting brackets of the side rear view mirrors of such vehicles.

Another very important object of the invention is to provide a ventilator of the aforementioned character comprising novel means for preventing insects, etc., from entering the vehicle with the air stream.

Other objects of the invention are to provide a motor vehicle ventilator of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a top plan view, showing a ventilator embodying the present invention in position on a motor vehicle;

Figure 2 is a rear perspective view thereof;

Figure 3 is a fragmentary view in horizontal section; and

Figure 4 is a perspective view of the plastic deflector and the foraminous guard.

Referring now to the drawings in detail, it will be seen that reference character 5 designates generally a pair of substantially similar, V-shaped upper and lower brackets. The brackets 5 are mounted at vertically spaced points on the upper portion of a door 6 of the vehicle, as at 7, and project horizontally therefrom.

The brackets 5 include front and rear legs 8 and 9, respectively, which are hingedly connected at one end, as at 10. The other ends of the legs 8 and 9 are secured to brackets 11 on the vehicle door. Mounted for rotary adjustment in a horizontal plane between the apex portions of the brackets 5 is a rear view mirror 12. The mirror 12 is observable from the operator's seat of the vehicle through the window 13 in the door 6.

It will be observed that the front legs 8 of the brackets 5 are directed laterally and rearwardly from the door 6 and that the rear legs 9 of said brackets extend laterally and forwardly from said door. Mounted vertically on the rear legs 9 of the brackets 5 is a substantially rectangular air scoop or deflector 14 of suitable transparent or tinted plastic. Of course, the deflector 14 may be of any other suitable material. The deflector 14 is provided in its upper corner portions with openings 15 and in its lower corner portions with vertical slots 16 which slidably accommodate the shanks 17 of spring hooks 18 which are engageable with the bracket legs 9 for firmly but removably securing said deflector in position thereon. As illustrated to advantage in Figure 3 of the drawing, the springs 19 of the hooks 18 are engaged with the deflector 14. The slots 16 permit vertical adjustment of the lower hooks 18 to permit variations in the distance between the upper and the lower brackets. The deflector 14 includes thickened or reinforced marginal portions 20.

Removably mounted on the front legs 8 of the brackets 5 is an insect, etc., guard for the deflector 14 in the form of a substantially rectangular screen 21. The foraminous guard 21 is provided in its upper portion with reinforced openings 22 and in its lower portion with reinforced vertical slots 23 which accommodate spring hooks 24 for removably mounting said guard on the brackets 5.

It is thought that the operation of the invention will be readily apparent from a consideration of the foregoing. Briefly, as the vehicle 7 moves forwardly, the inwardly and rearwardly inclined deflector 14 directs a stream of air thereinto through the window 13 in an obvious manner. The foraminous guard 21, being positioned ahead of the deflector 14, intercepts any insects or objects which may be in the air and deflects them outwardly away from the vehicle. If desired, the invention may be installed on both sides of the vehicle. When conditions warrant, the insect guard 21 may be used without the air deflector. Of course, the slots 23 permit vertical adjustment of the lower hooks 24.

It is believed that the many advantages of a motor vehicle ventilator constructed in accordance with the present invention will be readily understood and although a preferred embodiment of the device is as illustrated and described, it is to be understood that changes in the details of construction may be resorted to which will fall within the scope of the invention as claimed.

What is claimed is:

1. A motor vehicle ventilator comprising, in combination, a pair of substantially V-shaped, vertically spaced brackets mounted horizontally on the vehicle, a deflector mounted vertically on the brackets for directing a stream of air toward the vehicle, said deflector including a plate having openings therein, and spring hooks yieldingly mounted on said plate and operable in the openings and slidably engaged with certain of the legs of the brackets for slidably and removably mounting the plate thereon.

2. A motor vehicle ventilator comprising, in combination, a pair of vertically spaced, substantially V-shaped brackets mounted horizontally on the vehicle, and an insect guard comprising a foraminous sheet mounted on the brackets, said sheet having openings therein, and spring hooks yieldingly mounted on said guard and operable in the openings and slidably engaged with certain of the legs of the brackets for slidably and removably mounting said sheet thereon.

References Cited in the file of this patent

UNITED STATES PATENTS

| | | |
|---|---|---|
| 1,186,842 | Ryan | June 13, 1916 |
| 1,745,299 | Holan | Jan. 28, 1930 |
| 2,152,414 | Knight | Mar. 28, 1939 |